United States Patent
Furman (10) Patent No.: US 10,725,428 B2
(45) Date of Patent: Jul. 28, 2020

(54) METHODS AND SYSTEMS OF HOLOGRAPHIC INTERFEROMETRY

(71) Applicant: RD Synergy Ltd., Nes Ziona (IL)

(72) Inventor: Dov Furman, Rehovot (IL)

(73) Assignee: RD Synergy Ltd., Nes Ziona (IL)

( * ) Notice: Subject to any disclaimer, the term of this patent is extended or adjusted under 35 U.S.C. 154(b) by 204 days.

(21) Appl. No.: 15/614,687

(22) Filed: Jun. 6, 2017

(65) Prior Publication Data

US 2018/0348703 A1    Dec. 6, 2018

(51) Int. Cl.
| | |
|---|---|
| *G03H 1/04* | (2006.01) |
| *G01B 11/24* | (2006.01) |
| *G01B 9/02* | (2006.01) |
| *G03H 1/26* | (2006.01) |

(52) U.S. Cl.
CPC ....... *G03H 1/0402* (2013.01); *G01B 9/02005* (2013.01); *G01B 9/02032* (2013.01); *G01B 9/02097* (2013.01); *G01B 11/2441* (2013.01); *G03H 1/0443* (2013.01); *G03H 1/265* (2013.01); *G01B 2290/45* (2013.01); *G03H 2001/046* (2013.01); *G03H 2001/0456* (2013.01); *G03H 2001/266* (2013.01); *G03H 2222/13* (2013.01); *G03H 2226/13* (2013.01)

(58) Field of Classification Search
CPC . G03H 1/0402; G03H 1/0443; G01B 11/2441
See application file for complete search history.

(56) References Cited

U.S. PATENT DOCUMENTS

| | | |
|---|---|---|
| 4,478,481 A | 10/1984 | Fusek et al. |
| 7,362,449 B2 | 4/2008 | Dubois et al. |
| 7,471,430 B1 | 12/2008 | Andersen |
| 7,609,384 B2 | 10/2009 | Roosen et al. |
| 8,040,521 B2 | 10/2011 | Pfaff |
| 2006/0109482 A1 | 5/2006 | Duval et al. |
| 2008/0094600 A1* | 4/2008 | Freimann ............... G03B 27/54 355/71 |
| 2008/0304120 A1* | 12/2008 | Hayashida ............... G03H 1/02 359/3 |
| 2011/0255097 A1 | 10/2011 | Golan et al. |
| 2015/0253197 A1 | 9/2015 | Okamoto et al. |

(Continued)

FOREIGN PATENT DOCUMENTS

| | | |
|---|---|---|
| EP | 1411321 | 4/2004 |
| WO | WO 2018/225068 | 12/2018 |

OTHER PUBLICATIONS

International Search Report and the Written Opinion dated Oct. 1, 2018 From the International Searching Authority Re. Application No. PCT/IL2018/050617. (13 Pages).

(Continued)

*Primary Examiner* — William R Alexander
*Assistant Examiner* — Ephrem Z Mebrahtu (57) ABSTRACT

A holographic interferometer, comprising: at least one imaging device capturing an interference pattern created by at least two light beams; and at least one aperture located in an optical path of at least one light beam of the at least two light beams; wherein the at least one aperture is located away from an axis of the at least one light beam, thus transmitting a subset of the at least one light beam collected at an angle range.

14 Claims, 6 Drawing Sheets

(56) References Cited

U.S. PATENT DOCUMENTS

2017/0003650 A1\* 1/2017 Moser ................. G03H 1/0443

OTHER PUBLICATIONS

International Search Report and the Written Opinion dated Mar. 12, 2020 From the International Searching Authority Re. Application No. PCT/IL2019/051174. (10 Pages).
International Preliminary Report on Patentability dated Dec. 19, 2019 From the International Bureau of WIPO Re. Application No. PCT/IL2018/050617. (8 Pages).

\* cited by examiner

FIG. 1

```
┌─────────────────────────────────────┐
│ A digital image of an interference  │
│ pattern is received from an imaging │
│ device of a holographic             │
│ interferometer.                     │
└─────────────────────────────────────┘ 201
                  │
                  ▼
┌─────────────────────────────────────┐
│ A two-dimensional section of the    │
│ image is selected.                  │
└─────────────────────────────────────┘ 202
                  │
                  ▼
┌─────────────────────────────────────┐
│ The interference pattern in the     │
│ section is analyzed to find the     │
│ phase of the pattern, and to        │
│ estimate height of a respective     │
│ section of the subject structure.   │
└─────────────────────────────────────┘ 203
```

METHODS AND SYSTEMS OF HOLOGRAPHIC INTERFEROMETRY

FIELD AND BACKGROUND OF THE INVENTION

The present invention, in some embodiments thereof, relates to holographic imaging and, more particularly, but not exclusively, to methods and systems of three dimensional measurements using holographic interferometry.

Holographic imaging, which records amplitude and phase information of light arriving from an object (such as integrated circuit (IC) semiconductor wafers or flat panel display (FPD)), may be used in microscopy to reconstruct the 3D profile of the object, i.e. the relative height of each point in the image.

Some methods use zero angle between the object and reference image, and a phase scanning mechanism, which, combined with multiple image acquisitions at the same object location, give the possibility to separate between the phase and amplitude information. These methods may even use illumination with a very short coherent length. However, such schemes are generally too slow for applications in which the object needs to be laterally scanned in limited time, such as wafer inspection.

In order to achieve fast lateral scanning of the object using holographic interferometry, it is desired to be able to extract the phase information from a single image. This may be done by introducing a non-zero angle between the object beam and the reference beam, and the use of coherent illumination. The spatial frequency in the image depends on the angle between the object imaging optical axis and the reference imaging optical axis. When the object has for example a raised surface, the interference lines shift. By analyzing the images, it is possible to extract the phase change of the interference lines, and from that deduce the height of the features in the object.

To be able to extract the phase information from the image, the interference lines need to be with a density low enough so that the camera pixelization will not average them out, but high enough to have a good lateral resolution of the phase information (this resolution is typically one cycle of interference lines).

SUMMARY OF THE INVENTION

According to an aspect of some embodiments of the present invention there is provided a holographic interferometer, comprising: at least one imaging device capturing an interference pattern created by at least two light beams; and at least one aperture located in an optical path of at least one light beam of the at least two light beams; wherein the at least one aperture is located away from an axis of the at least one light beam, thus transmitting a subset of the at least one light beam collected at an angle range. This separates the beams arriving from different chief angles of collected light.

Optionally, the at least one aperture includes at least two apertures, each differently located away from an axis of a respective of the at least two light beams than another of the at least two apertures, thus transmitting a substantially different subset of the respective of the at least two light beams.

More optionally, the holographic interferometer further comprises at least two imaging devices, each capturing an interference pattern created by light passing through one of the at least two apertures.

More optionally, the holographic interferometer, simulating different wavelengths from a single wavelength light source, further comprises: a monochromatic coherent light source; and an optical setup which splits light from the light source into a first light beam which illuminates a subject structure and a second light beam which illuminates a reference mirror; and combines the first light beam and the second light beam to a single combined beam. Using different effective wavelength from a single wavelength light source thus removes the need for an expensive, multiple wavelength light source.

More optionally, an optical path of the first light beam is optically identical to an optical path of the second light beam.

More optionally, the holographic interferometer has no reference mirror, and each of the at least two apertures is located in an optical path of one of the at least two light beams.

Optionally, the holographic interferometer further comprises: at least one beam splitter which splits an original light beam into the at least two light beams.

More optionally, the holographic interferometer has no reference mirror, and the beam splitter splits a beam reflected from a subject structure into the at least two light beams.

More optionally, the holographic interferometer further comprises monochromatic coherent light source illuminating the subject structure.

Optionally, at least one of position, size and shape of the at least one aperture is dynamically controlled to create multiple different interference patterns.

Optionally, a magnification of the holographic interferometer is dynamically controlled to create multiple different interference patterns.

Optionally, a focus of the holographic interferometer is dynamically controlled to create multiple different interference patterns.

According to an aspect of some embodiments of the present invention there is provided a method of setting a holographic interferometer, comprising: positioning at least one imaging device capturing an interference pattern created by at least two light beams; and positioning at least one aperture located in an optical path of at least one light beam of the at least two light beams; wherein the at least one aperture is located away from an axis of the at least one light beam, thus transmitting a subset of an the at least one light beam collected at an angle range.

According to an aspect of some embodiments of the present invention there is provided a holographic interferometer, comprising: at least one monochromatic coherent light source; an imaging device which captures an interference pattern; and an optical setup which splits light from the light source into a first light beam which illuminates a subject structure and is reflected into the imaging device; and a second light beam which illuminates a reference mirror and is reflected into the imaging device to create the interference pattern; wherein an optical path of the first light beam is optically identical to an optical path of the second light beam. This ensures that the phase difference between the object image and the reference image is essentially determined by the object features and the planned angle between the images.

According to an aspect of some embodiments of the present invention there is provided a method of obtaining height measurement of a subject structure from an image produced by a holographic interferometer, comprising: receiving a digital image of an interference pattern from an imaging device of a holographic interferometer, the interference pattern is created by an imaging of a subject structure; selecting a two-dimensional section of the image; analyzing the interference pattern in the two-dimensional section to calculate phase of the interference pattern; and estimating height of a respective section of the subject structure from the phase. This limits the spatial smearing and is computationally cheaper than common methods.

Optionally, size of the two-dimensional section is smaller than ten times a theoretical optical spot size of the holographic interferometer.

Optionally, size of the two-dimensional section is smaller than a tenth of a size of the image.

Optionally, the interference pattern includes the sum of interference images of at least two wavelengths.

Optionally, the analyzing includes Fourier transform over the two-dimensional section.

Optionally, the interference pattern has substantially integer number of cycles inside the two-dimensional section.

Optionally, the analyzing includes iterative calculation of an amplitude and the phase.

According to some embodiments of the invention there is provided a computer readable medium comprising computer executable instructions adapted to perform the method.

According to an aspect of some embodiments of the present invention there is provided a software program product for obtaining height measurement of a subject structure from an image produced by a holographic interferometer, comprising: a non-transitory computer readable storage medium; first program instructions for receiving a digital image of an interference pattern from an imaging device of a holographic interferometer, the interference pattern is created by an imaging of a subject structure; second program instructions for selecting a two-dimensional section of the image; third program instructions for analyzing the interference pattern in the two-dimensional section to calculate phase of the interference pattern; and fourth program instructions for estimating height of a respective section of the subject structure from the phase; wherein the first, second, third, and fourth program instructions are executed by at least one computerized processor from the non-transitory computer readable storage medium.

Unless otherwise defined, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention may involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

The present invention, in some embodiments thereof, relates to holographic imaging and, more particularly, but not exclusively, to methods and systems of three dimensional measurements using holographic interferometry.

According to some embodiments of the present invention, there is provided a holographic interferometer having identical optical paths for the object beam and the reference beam, to maximize uniformity of the interference lines on the field of view. This is done by constructing a reference image of a mirror, with essentially the same optical path that is used for constructing the object image.

In many optical setups, it may be difficult to achieve uniform interference line density across the entire field-of-view, as even when the optics is diffraction limited and the object is in focus, the phase of an image point (relative to, for example, the image point at the center of field with a flat object field) may change rapidly when moving across the field, especially away from the center of field (the optical axis). Typically for these setups, the reference image does not exhibit this phase behavior, as it has a different optical setup than the object image, so the interference between the images produces an image in which the interference lines density changes across the field (even for a flat object at focus), typically becomes denser the further from the field-of-view center, and may even disappear when the interference lines become denser than the camera pixels. The twin optical paths holographic imaging setup solves this problem by ensuring that the phase difference between the object image and the reference image is essentially determined by the object features and the planned angle between the images.

According to some embodiments of the present invention, there is provided a method of obtaining height measurement of a subject structure from an image produced by a holographic interferometer, by analyzing the image using small blocks of pixels (super pixels) to find the phase and estimate the height for each one.

Common practice for finding the phase for every point in an interference pattern image, is to use a Fourier transform over the whole image (or a large portion of it, e.g. a region of interest), perform some operations in the Fourier space (such as shifting the origin, digital filtering) and then inversing the Fourier transform back. The first difficulty is that the operations in the Fourier space tend to smear the information in the spatial space, hence introducing errors in the phase measurement. The second difficulty is that the Fourier transformation (and its inverse) is computationally expensive, even when fast Fourier transform (FFT) algorithms are used. Using super pixels limits the spatial smearing to the size of the super pixel, and is computationally cheaper.

According to some embodiments of the present invention, there is provided a holographic interferometer using multiple angle split beams from a single light source. This is done by separating the beams arriving from different chief angles of collected light in the original beam (reflected from the object and/or reference mirror), using apertures. Each aperture allows passage of light arriving from a different angles range so a different portion of the aperture plane is selected and transmitted. One or more apertures are used, located in an optical path of one of the beams that are optionally split by a beam splitter. Each of the apertures is located away from the axis of the split beam, optionally at a different angle than the other aperture(s). The exact position, shape and size of the aperture relative to the beam axis controls the collected angles range of the beam that are used for the path. Light transmitted through these different portions of the aperture planes creates the angle split beams. This idea may be used in different ways and with different optical setups to create an interference pattern. For example, multiple angle split beams may be used to simulate multiple wavelengths and create multiple interference patterns, and/or may be used to interfere with each other to create the interference pattern.

According to some embodiments, multiple interferometric images are taken using a single wavelength, each of these images contains phase information which corresponds to a different chief ray angle. The phase dependence on the height of a point depends on these angles, so the angle split beams may also be referred to as having 'effective wavelengths'. The effective wavelength is therefore controlled by choosing the angle of the collected light that is used for the image construction on the camera.

In many cases one interferometric image is not enough, as the dynamic range of the height is limited by the wavelength used for the imaging. A common solution to this is to use several interferometric images, taken with different wavelengths. Careful choice of the wavelengths enables to obtain a dynamic range larger than the wavelengths used for the imaging (this is known as unwrapping the phase, or as constructing a synthetic wavelength). Tunable laser sources with precisely controlled wavelengths are needed in order to achieve a large dynamic range for height measurement, and some tweaking in the wavelengths may be used to optimize system performance. Using different effective wavelength from a single wavelength light source thus removes the need for an expensive, multiple wavelength light source.

According to some embodiments, the holographic interferometer has no reference mirror, and the interference is between two images based on two different chief-ray angles of light collected from the object. A monochromatic coherent light source may be used, or an external ambient illumination.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

Figure 1:
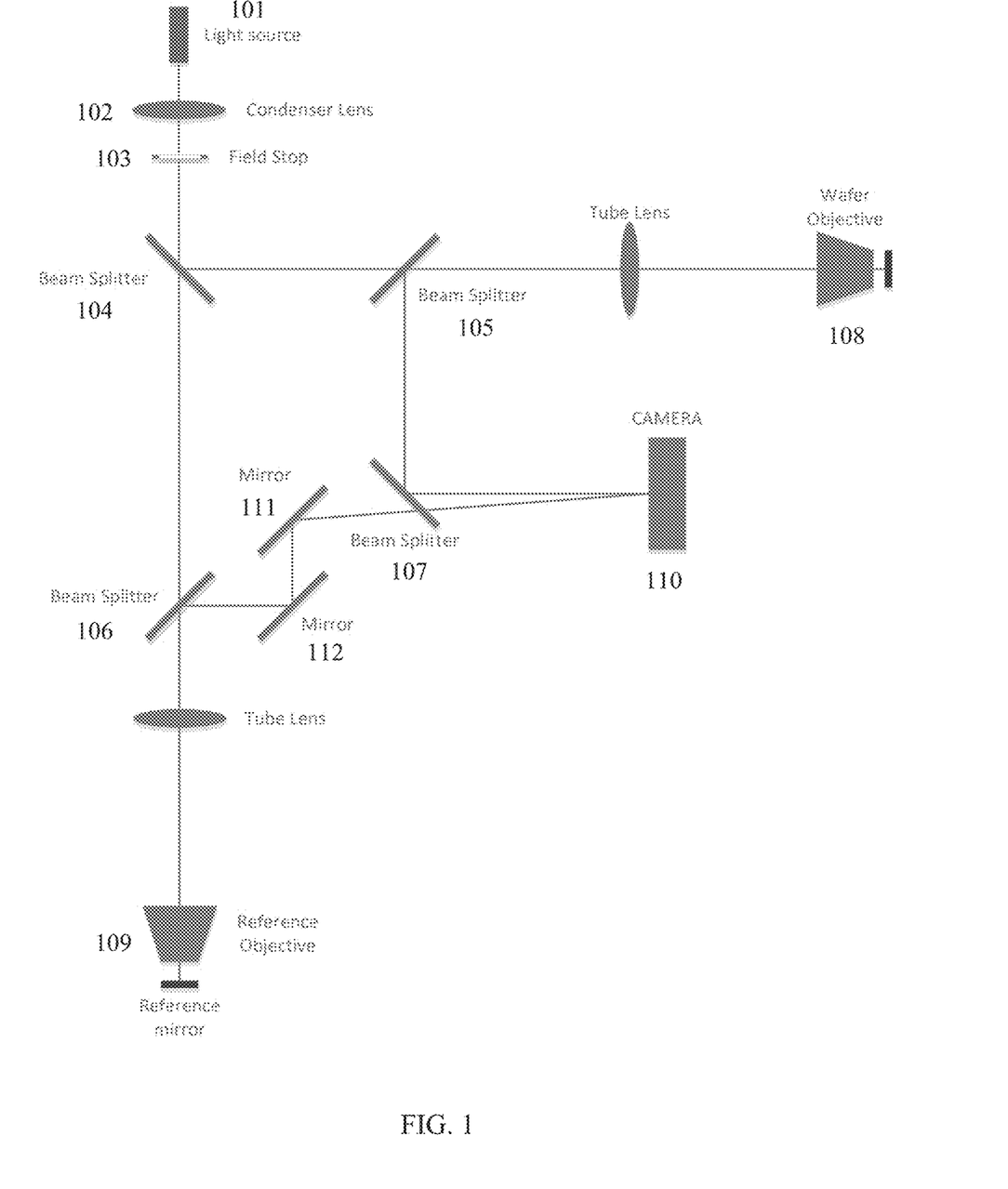
FIG. 1 is a schematic illustration of an exemplary twin optical paths holographic imaging setup, according to some embodiments of the present invention.

Referring now to the drawings, FIG. 1 is a schematic illustration of an exemplary twin optical paths holographic imaging setup, according to some embodiments of the present invention. The image of a reference mirror is constructed with essentially the same optical path that is used for constructing the object image—the optical paths of the two beams are optically identical. A monochromatic coherent light source 101 and a condenser lens 102 create an illumination field plane on a field stop 103. Beam splitters 104, 105, 106 and 107 split the light between the object leg (a light beam which illuminates a subject structure 108) and the reference leg of the interferometer (a light beam which illuminates a reference mirror 109), and then combine the reflected image on an imaging device, such as a camera 110.

Light source 101 may be, for example, light-emitting diode (LED), continuous wave (CW) lasers, and/or pulsed lasers. The subject structure may be any type of object having height differences small enough for interferometric measurement, such as integrated circuit (IC) semiconductor wafers, semiconductors, flat panel displays (FPDs) and/or printed circuit boards (PCBs). The imaging device may be a light sensor, film, camera and/or any other type of light capturing device.

An angle between the object optical axis and the reference optical axis creates a line interference pattern on camera 110, from which the relative phase between the object image and the reference image may be deduced. To get an interference pattern, the coherence length of the illumination needs to be longer than the optical path difference between the object leg and the reference leg.

Optionally, this scheme may easily be extended to use multiple monochromatic wavelengths by assigning a camera for each wavelength and using dichroic beam splitters to send each wavelength image to its assigned camera.

Optionally, a scheme using multiple wavelengths with a single camera is also possible, by replacing mirrors 111, 112 with sets of dichroic beam splitters, each set giving a different angle to the reference image of each wavelength.

Figure 2:
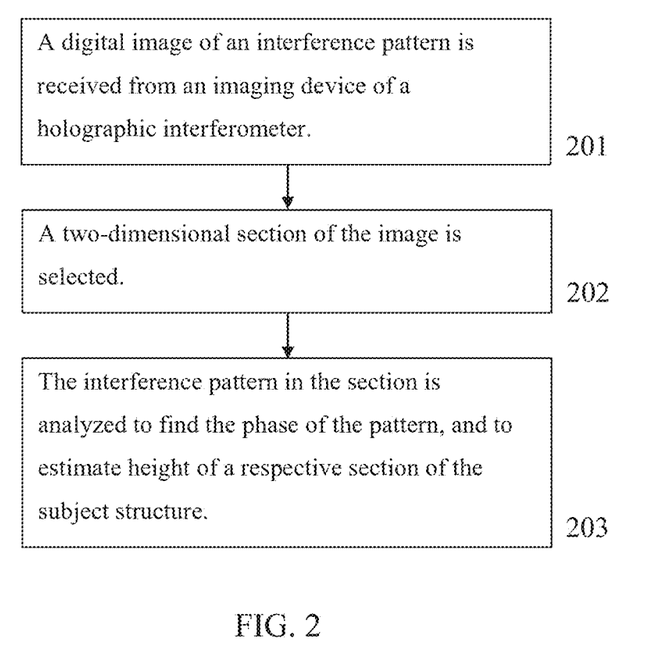
FIG. 2 is a flowchart schematically representing a method of obtaining height measurement of a subject structure from an image produced by a holographic interferometer, according to some embodiments of the present invention.

Reference is now made to FIG. 2, which is a flowchart schematically representing a method of obtaining height measurement of a subject structure from an image produced by a holographic interferometer, according to some embodiments of the present invention.

First, as shown at 201, a digital image of an interference pattern, created by an imaging of a subject structure, is received from an imaging device of a holographic interferometer.

The reference plane may be tilted in order to achieve sub-pixel resolution of the interferometric lines. For example, a tilt calculated as: sin(axisangle)=1/(length of super pixel, in pixels), gets a uniform distribution of sub-sampling.

Then, as shown at 202, a two-dimensional section of the image (also referred to as 'super pixel' or analysis window) is selected. The super pixel is a group of pixels, for which the vertical axis information is obtained, such as height and/or thickness. The size of the super pixel may be, for example, about the theoretical optical spot size, smaller than ten times the theoretical optical spot size, smaller than a tenth of the size of the image and/or any other size.

For multi-wavelength optical setup using a single camera, the number of sub-pixels in the super pixel is determined by the ability to extract the phases reliably from the combined interference pattern. The size of the pixels on the subject structure depends on optical magnification of the image. Super pixel size (measured in number of pixels) is defined to give the individual phases for all wavelengths used. For example, three wavelengths arranged in one dimension need a minimum of 2*(number of wavelengths)+1=7 pixels. Since the optical spot is symmetric, the super pixel in this case may be defined as 7×7 pixels. It is possible to use a 2D arrangement, in which case a 5×5 super pixel may accommodate up to 4 wavelengths, 7×7 may accommodate up to 6 wavelengths, etc. Working with smaller super pixel may be used to increase the throughput, but it may reduce phase accuracy (as fewer pixels are used to calculate the phases).

Figure 3:
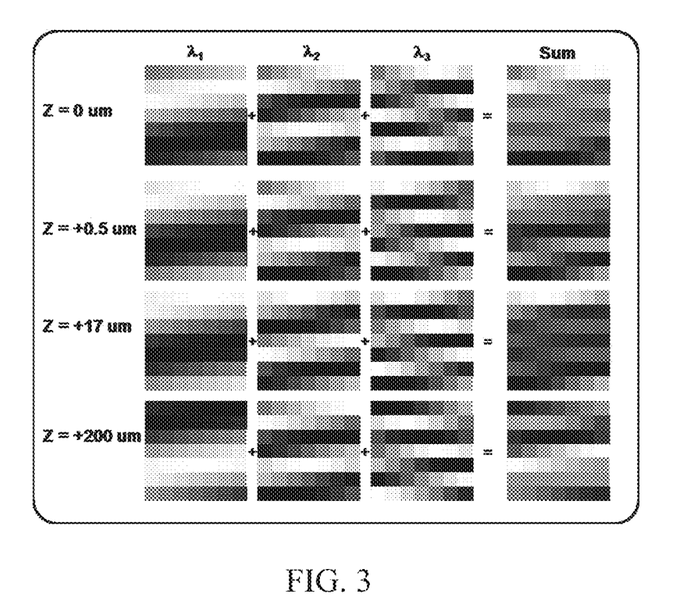
FIG. 3 is an exemplary super pixel from an image expected as a response to different feature z-height of the subject structure, according to some embodiments of the present invention.

Reference is made to FIG. 3, which is an exemplary super pixel from an image expected as a response to different feature z-height of the subject structure, according to some embodiments of the present invention. Since the wavelengths do not interfere, the image in the camera is the simple sum of the three images of each of the three wavelengths, as the camera in this setup is monochromatic.

Optionally, for multi-wavelength optical setup, separating between the imposed interference patterns of the different wavelengths may be done by designing the reference beam angles so each wavelength interference pattern has a different, substantially integer number of cycles inside the super pixel. The reference reflection plane 109 use a small angle to wafer for each wavelength, which may be chosen so there is a complete number of cycles in the super pixel. The number of cycles may be one for the first wavelength ($\lambda_1$), two for the second, etc. The angle is selected so that d sin $\theta_1=\lambda_1$, d sin $\theta_2=\lambda_2$, etc, while d is the size of the super pixel. This way, a simple Fourier analysis of the intensity of the pixels in the super pixel may give the phase of each wavelength, as well as amplitude of the modulation per wavelength. An optical way to achieve this may be by injecting the references from different azimuth angles by separate, different optics than the image.

Then, as shown at 203, the interference pattern in the section is analyzed to find the phase of the pattern, and to estimate height of a respective section of the subject structure.

The intensity of light field over a super pixel of n on m pixels indexed by x,y may be represented as:

$$I_{x,y} = |E_{Object} + E_{Reference}|^2$$
$$= |Ae^{i\varphi} + Be^{i\theta_{x,y}}|^2$$
$$= (A\cos(\varphi) + B\cos(\theta_{x,y}))^2 + (A\sin(\varphi) + B\sin(\theta_{x,y}))^2$$
$$= (A^2 + B^2 + 2AB(\cos(\theta_{x,y})\cos(\varphi) + \sin(\varphi)\sin(\theta_{x,y})))$$
$$= A^2 + B^2 + 2AB\cos(\theta_{x,y} - \varphi),$$

where $Ae^{i\varphi}$ represent the amplitude and phase of the object image, and $Be^{i\theta_{x,y}}$ represent the amplitude and phase of the reference image. It is assumed that the amplitude and phase of the object image are constant over the super pixel. This is approximately true for a super pixel of the size of the optical spot or smaller, and/or when the object has a flat surface with constant height at this area. The x,y dependence for the phase of the reference beam arises from the interference lines (i.e. the angle between object and reference images).

Optionally, when n is an integer multiply of the interference lines spatial wavelength, the computation to extract the phase from the super pixel is very simple (FFT is not needed as only the phase of a single frequency is needed).

For example, when $$\theta_{x,y} = x*2*\frac{pi}{n},$$

x=0, 1, . . . (n−1), the phase φ is found by using $$e^{i\varphi} = \left(\sum_{x,y} e^{i\theta_{x,y}} \cdot I_{x,y}\right) \Big/ \left|\sum_{x,y} e^{ix*2*\frac{pi}{n}} \cdot I_{x,y}\right|.$$

The values of $\theta_{x,y}$ may be determined in a calibration, e.g. where the object has a flat surface, which is defined to be at zero height.

Optionally, when n is not an integer multiply of the interference lines spatial wavelength, the following example for an iterative procedure may be used to extract the phase and amplitude of the interference lines on a super pixel.

1. Use calibration to determine $\theta_{x,y}$ and B ($\theta_{x,y}$ may be determined as described above, B by using a non-reflecting object such as a beam stop).
2. Estimate A using $A^2 \approx (\Sigma_{x,y}(I_{x,y}-B^2))/(nm)$
3. Solve the n*m linear, over-constrained equation set in [A cos(φ)] and [A sin(φ)]:

$$2B\cos(\theta_{x,y})[A\cos(\varphi)] + 2B\sin(\theta_{x,y})[A\sin(\varphi)] - (I_{x,y} - A^2 - B^2) = 0$$

using the Moore-Penrose pseudoinverse of the coefficient matrix.
4. Extract A and φ from the solution.
5. When needed, repeat step 3 using the new estimation for A and then repeat step 4. Repeat until A and φ converge.

Optionally, this algorithm may be extended to cases where several interference images are recorded on a single camera.

In these cases, there are two variables for every interference image, and it is advantageous to choose the (2D) spatial frequencies of the images interference lines to minimize the noise amplification of the inverse matrix.

Figure 4:
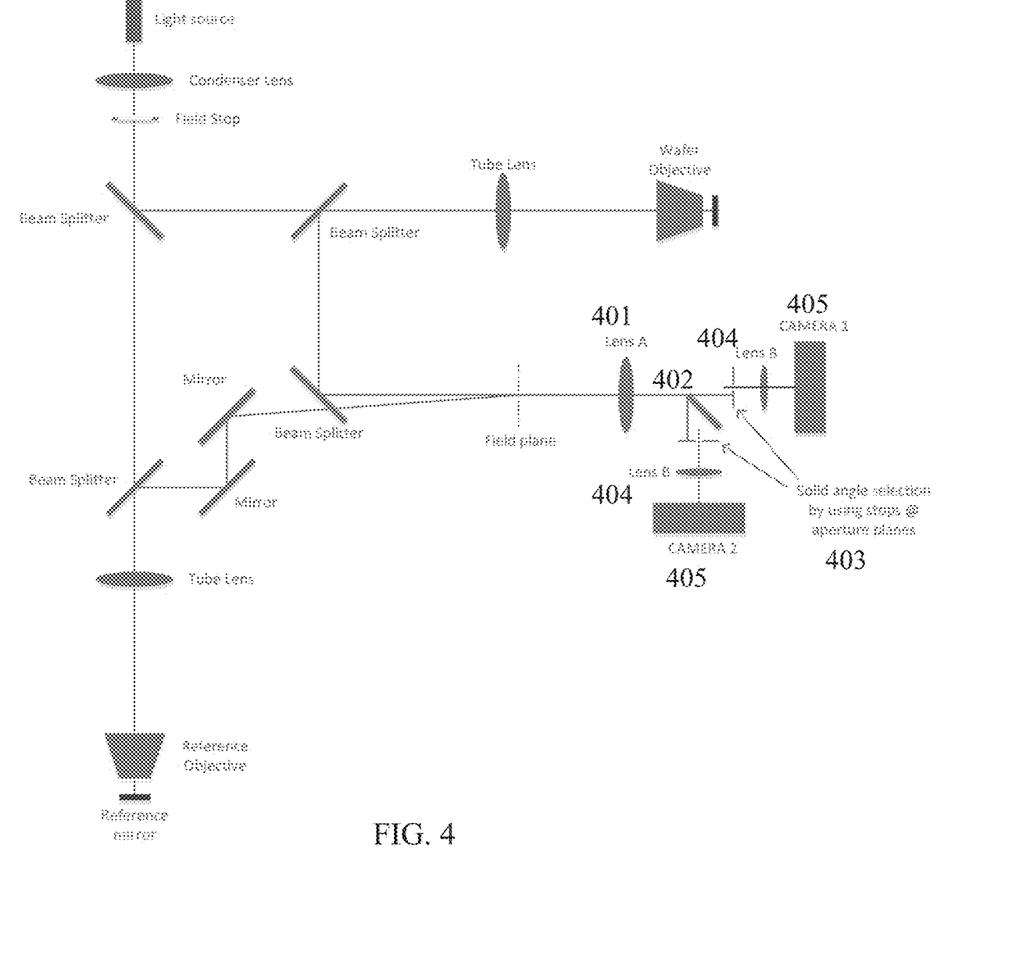
FIG. 4 is a schematic illustration of an optical setup of a holographic interferometer for taking multiple interferometric images with a single wavelength, according to some embodiments of the present invention.

Reference is now made to FIG. 4, which is a schematic illustration of an optical setup of a holographic interferometer for taking multiple interferometric images (two for this example) with a single wavelength, according to some embodiments of the present invention. Each of these images contains phase information which corresponds to different chief ray angle and thus to a different angle split beam (or effective wavelength), removing the need for using multiple true wavelengths and thus the need for an expansive, multiple wavelength light source.

The idea is to select for the different images different chief angles of collected light (reflected from the object). The phase dependence on the Z height of a point depends on these angles, hence the effective wavelength (in regards to the dependence of the phase on Z) is controlled by choosing the angle of the collected light that is used for the image construction on the camera.

Optionally, one or both aperture shift angles, position, shape and/or size are dynamically controlled and/or changed in order to produce multiple images each having a different effective wavelength. Optionally, this setup may include only one camera, so image may be taken with a different effective wavelength at a different time.

Optionally, the focus and/or magnification of the optical system are changed and/or dynamically controlled in order to produce multiple different images. Combining these images may increase the dynamic range of the height profiling or distance measurement. Optionally, the changes of aperture(s), focus and/or magnification are controlled by a computer.

In this example, the reference and object light paths are joined the same way as in the example of FIG. 1, but instead of a camera at the imaged field plane, a lens 401 is placed such that the imaged field plane is at the focal plane of the lens. Lens 401 images the aperture plane of the objective at a distance equal to its focal length. A beam sharer 402 is placed near the imaged aperture plane of the objective and splits the beam in to two paths. In each path, an aperture 403 is placed. Each aperture 403 is diagonally shifted (located away) from the axis of the beam. The exact position, shape and size of aperture 403 relative to the beam axis controls the collected angles range of the beam that are used for the path. A re-image lens 404 in each path is used to re-image the object on each camera 405, using only the collected angles range passed by aperture 403.

Figure 5:
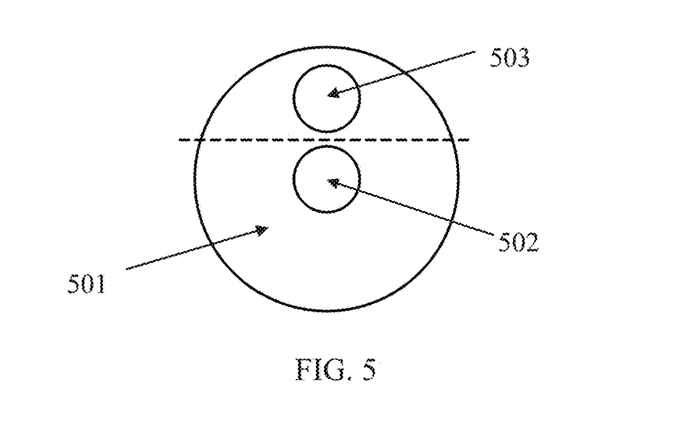
FIG. 5 is a schematic illustration of an aperture plane, according to some embodiments of the present invention.

Reference is also made to FIG. 5, which is a schematic illustration of an aperture plane, according to some embodiments of the present invention. Circle 501 represents the objective acceptance cone of the beam. Circle 502 represents a light cone which is normal to the surface of the aperture, i.e. an aperture not shifted from the axis of the beam, while circle 503 represent a cone of angle θ of the beam, i.e. an aperture shifted from the axis of the beam.

Figure 6:
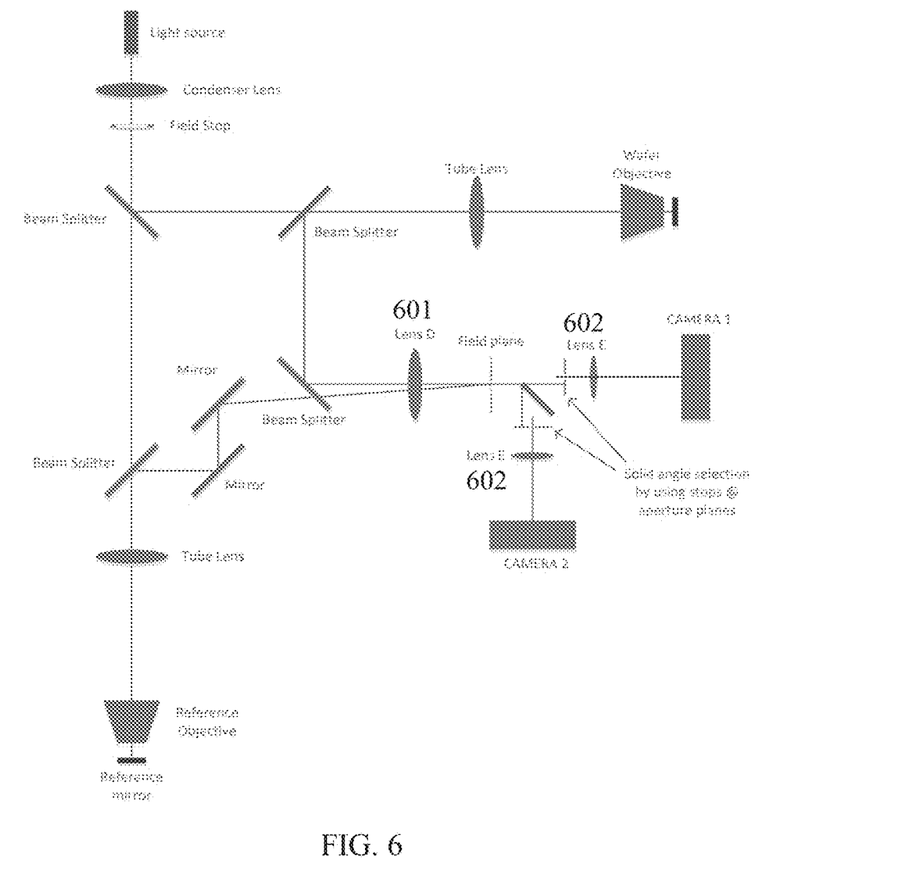
FIG. 6 is a schematic illustration of an alternative optical setup of a holographic interferometer for taking multiple interferometric images with a single wavelength, according to some embodiments of the present invention.

Reference is also made to FIG. 6, which is a schematic illustration of an alternative optical setup of a holographic interferometer for taking multiple interferometric images with a single wavelength, according to some embodiments of the present invention. Lens 601 (lens D) is placed at its focal distance before the conjugate field plane generated by the tube lens. Lens 601 moves the field plane to half the distance between itself and its focus, and generate an aperture plane at its focus. A beam sharer (or a beam splitter) split the beam before the aperture plane, where the solid angle to use for each camera is selected. Lens 602 (lens E) has half the focal length of lens 601, and it is placed where the aperture plane is at its focus, while the field plane is at twice that distance, so Lens 602 re-image the field plane on the camera (which is at a distance of twice its focal length).

Optionally, the optical setups described in FIG. 4 and FIG. 6 may be altered to use multiple wavelengths with a single camera, by replacing the mirrors with sets of dichroic beam splitters, as described for FIG. 1.

Figure 7:
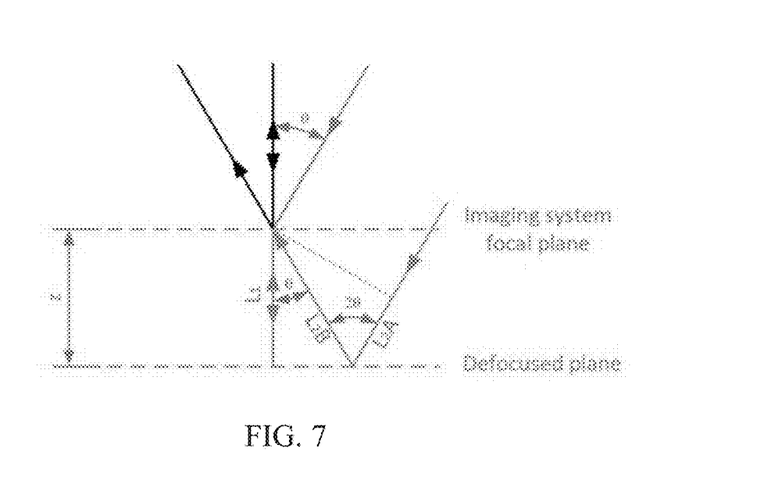
FIG. 7 is a simplified example that compares between the optical path length difference two chief ray angles of light illumination and collection.

Reference is now made to FIG. 7, which is a simplified example that compares between the optical path difference of two chief ray angles of light illumination and collection, when the reflecting surface of an object changes its height by Z.

The first angle is normal to the surface and the second angle is θ to the normal. For convenience of explanation, the initial surface position is in focus, and the measured phase of both angles in the initial state is zero.

For the first angle, the phase change is $\varphi 1 = kL1 = k*2Z$, where k is the wave number in radians/unit length. For the second, the phase change is $\varphi 2 = k(L_{2A} + L_{2B})$, where $L_{2A} = L_{2B} \cos 2\theta$ and $L_{2B} = Z/\cos \theta$ so $\varphi 2 = kZ (1+\cos 2\theta)/\cos \theta = k*2Z*\cos \theta$. The phase change in the second case is the same as for a normal angle case, but with an 'effective wave number' of $k \cos \theta$. So, when the effective wavelength corresponding to the normal (first) angle is λ, the effective wavelength corresponding to the second incident angle is $\lambda/\cos \theta$.

Optionally, the aperture position and diameter are controlled from a computer to grant flexibility and/or calibration of the effective wave number. The aperture may include a circular hole and/or any other shape.

Optionally, additional beam splitters and/or beam sharers are added to utilize more than two interference images. This is useful to increase the dynamic range of height measurement.

Figure 8:
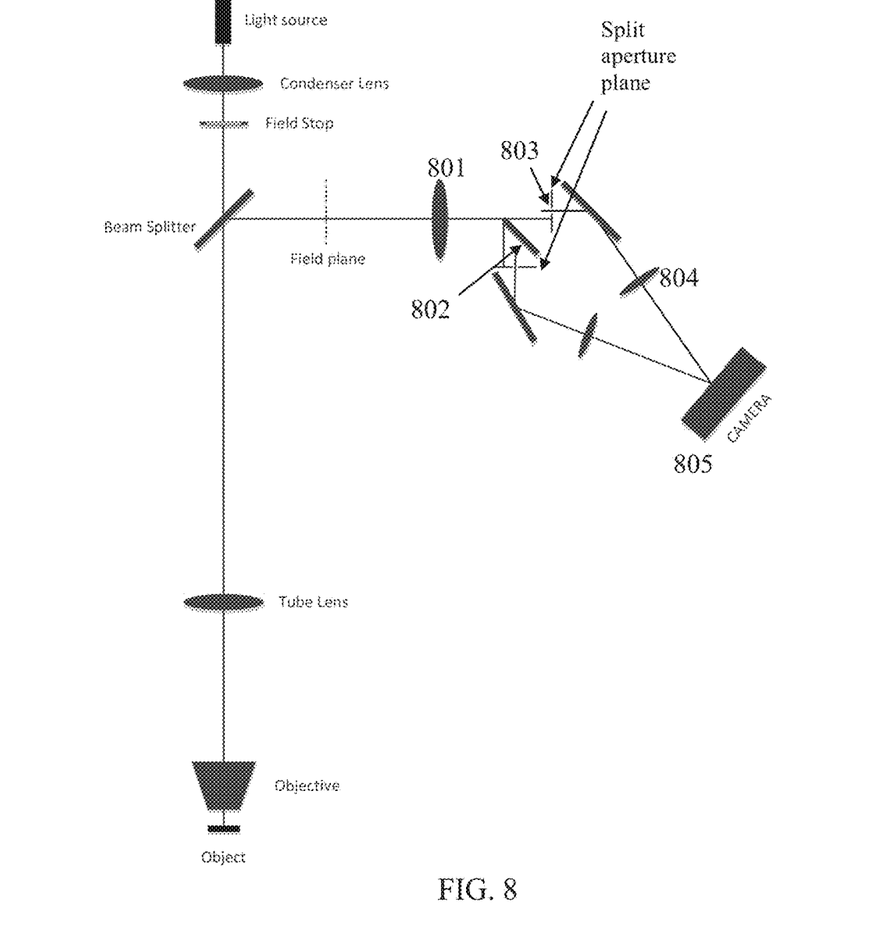
FIG. 8 is a schematic illustration of an optical setup of a holographic interferometer with no reference, according to some embodiments of the present invention.

Reference is now made to FIG. 8, which is a schematic illustration of an optical setup of a holographic interferometer with no reference, according to some embodiments of the present invention. In this setup, the interference is between two angles of light collected from the object. A lens 801 images the aperture plane, beam sharer 802 splits the beam for apertures 803. After re-imaging lenses 804, the two beams, each of a different angle, interfere on camera 805.

Figure 9:
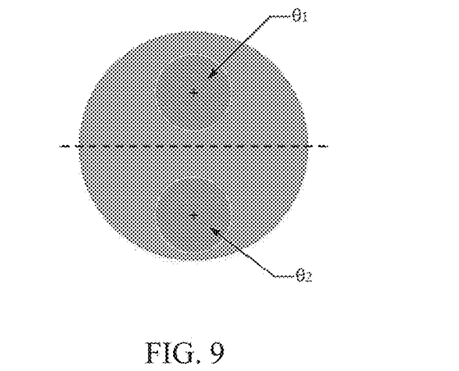
FIG. 9 is a schematic illustration of an aperture plane, according to some embodiments of the present invention.

Reference is now made to FIG. 9, which is a schematic illustration of an aperture plane, according to some embodiments of the present invention. The large circle represents the objective acceptance cone of the beam, while the two smaller circles represent the cones of different angles of the beam that are used for the interfering images.

The effective wave number in this case is $k|\cos(\theta_1) - \cos(\theta_2)|$, where $\theta_1$ and $\theta_2$ are some effective angles to the normal in the object plane, and k is the single wavelength wave number. The corresponding effective wavelength is $\lambda/|\cos(\theta_1) - \cos(\theta_2)|$.

It is advantageous to accurately align the two interfering images on the camera, to reduce spatial smearing of the combined image.

Figure 10:
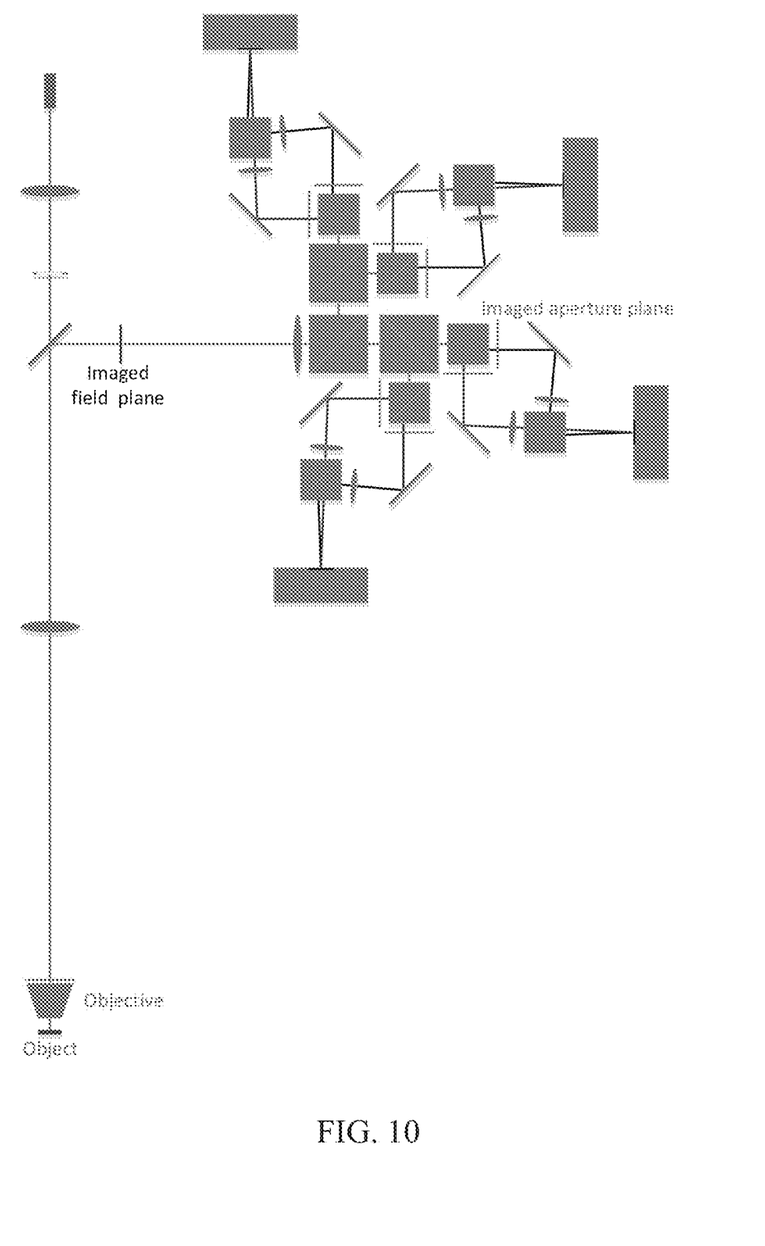
FIG. 10 is a schematic illustration of an optical setup of a holographic interferometer which is utilizes beam splitters to achieve four different effective wavenumbers, according to some embodiments of the present invention.

Optionally, additional beam splitters and/or beam shares are added to produce additional interference images, with different effective wave numbers. Reference is now made to FIG. 10, which is a schematic illustration of an optical setup of a holographic interferometer which is utilizes beam splitters to achieve four different effective wavenumbers, according to some embodiments of the present invention. This scheme may be used to increase the dynamic range of height measurement by a power of 4.

Optionally, the object illumination may be external to the shown system. The coherence length still needs to be longer than the optical path difference between the two interfering images, and in addition, coherence is needed between the different angles of collection.

Optionally, a spectral filter is added to the optical system. The spectral filter increases the coherence length, as well as reduces smearing of the interference lines. The optimization of this filter will depend on the application and on the external illumination.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant interferometers will be developed and the scope of the term interferometry is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A holographic interferometer having no reference mirror, comprising:
   at least one imaging device capturing an interference pattern created by at least two light beams; and
   at least two apertures, each located along an optical path of one light beam of said at least two light beams;
   wherein said at least two apertures are each differently located away from an optical axis of a respective one of said at least two light beams, thus transmitting a substantially different subset of said respective one of said at least two light beams; and
   wherein each of said at least two light beams is arriving into said at least one imaging device at a different angle with respect to said at least one imaging device, to create said interference pattern.

2. The holographic interferometer of claim 1, further comprising:
   at least one beam splitter which splits an original light beam into said at least two light beams.

3. The holographic interferometer of claim 2, wherein said original beam is a beam reflected from a subject structure.

4. The holographic interferometer of claim 3, further comprising monochromatic coherent light source illuminating said subject structure.

5. The holographic interferometer of claim 1, wherein at least one of position, size and shape of said at least one aperture is dynamically controlled to create multiple different interference patterns.

6. The holographic interferometer of claim 1, wherein a magnification of said holographic interferometer is dynamically controlled to create multiple different interference patterns.

7. The holographic interferometer of claim 1, wherein a focus of said holographic interferometer is dynamically controlled to create multiple different interference patterns.

8. The holographic interferometer of claim 1, wherein said at least two light beams are reflected from a subject structure.

9. The holographic interferometer of claim 1, wherein said interference pattern is indicative of a height measurement of a subject structure.

10. The holographic interferometer of claim 3, further comprising:
- a lens located along an optical path of said original light beam and generates an aperture plane;
- wherein said beam splitter is located before said aperture plane along said optical path of said original light beam, thus splitting said aperture plane.

11. The holographic interferometer of claim 10, wherein said at least two apertures are located at said split aperture plane.

12. The holographic interferometer of claim 1, wherein each said subset includes light collected at different angles with respect to said optical axis.

13. The holographic interferometer of claim 1, wherein at least one of said at least two apertures is not centered with respect to said optical axis of said respective one of said at least two light beams.

14. A method of setting a holographic interferometer having no reference mirror, comprising:
- positioning at least one imaging device for capturing an interference pattern created by at least two light beams; and
- positioning at least two apertures, each along an optical path of one light beam of said at least two light beams;
- wherein said at least two apertures are each differently located away from an optical axis of a respective one of said at least two light beams, thus transmitting a substantially different subset of said respective one of said at least two light beams; and
- wherein each of said at least two light beams is arriving into said at least one imaging device at a different angle with respect to said at least one imaging device, to create said interference pattern.

* * * * *